(12) United States Patent
Wyszka et al.

(10) Patent No.: US 11,878,710 B2
(45) Date of Patent: Jan. 23, 2024

(54) METHOD FOR CARRYING OUT A CORRECTION OF THE DIRECTION OF TRAVEL BY A DRIVER ASSISTANCE SYSTEM IN A MOTOR VEHICLE, AND A CONTROL DEVICE THEREFOR

(71) Applicant: Volkswagen Aktiengesellschaft, Wolfsburg (DE)

(72) Inventors: Robert Jan Wyszka, Hannover (DE); Daniel Morales Fernandez, Braunschweig (DE); Adrian Haar, Hannover (DE); Michael Wittkämper, Braunschweig (DE); Pia Kodalle, Osnabrück (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 114 days.

(21) Appl. No.: 17/614,783

(22) PCT Filed: Apr. 6, 2020

(86) PCT No.: PCT/EP2020/059797
§ 371 (c)(1),
(2) Date: Nov. 29, 2021

(87) PCT Pub. No.: WO2020/239303
PCT Pub. Date: Dec. 3, 2020

(65) Prior Publication Data
US 2022/0227384 A1   Jul. 21, 2022

(30) Foreign Application Priority Data
May 29, 2019   (DE) ............. 10 2019 207 951.2

(51) Int. Cl.
*B60W 50/16*   (2020.01)
*B60W 30/12*   (2020.01)
(Continued)

(52) U.S. Cl.
CPC ............. *B60W 50/16* (2013.01); *B60K 35/00* (2013.01); *B60W 30/12* (2013.01);
(Continued)

(58) Field of Classification Search
CPC ................. B60W 50/16; B60W 30/12; B60W 2050/146; B60K 35/00; B60K 2370/1529;
(Continued)

(56) References Cited

U.S. PATENT DOCUMENTS

| 9,987,926 B2 | 6/2018 | Cho et al. |
| 10,181,266 B2 | 1/2019 | Gupta et al. |

(Continued)

FOREIGN PATENT DOCUMENTS

| DE | 102013016242 A1 | 4/2015 | ............ B60K 31/00 |
| DE | 102017212367 A1 | 1/2019 | ............ B60R 16/02 |

(Continued)

OTHER PUBLICATIONS

German Office Action, Application No. 102019207951.2, 8 pages, dated Nov. 4, 2019.

(Continued)

*Primary Examiner* — Chico A Foxx
(74) *Attorney, Agent, or Firm* — Slayden Grubert Beard PLLC

(57) ABSTRACT

The disclosure relates to a method for performing a correction of a direction of travel by a driver assistance system in a motor vehicle. The disclosure provides that a need for correcting a direction of travel is recognized by a control device of the driver assistance system in order to continue operating the motor vehicle within a currently traveled lane, at least one display symbol is output by an output apparatus to display the correction of the direction of travel to be performed and being performed, and the correction of the direction of travel is performed by controlling steering of the motor vehicle.

20 Claims, 2 Drawing Sheets

(51) Int. Cl.
*B62D 15/02* (2006.01)
*B60K 35/00* (2006.01)
*B60W 50/14* (2020.01)

(52) U.S. Cl.
CPC .. *B62D 15/0295* (2013.01); *B60K 2370/1529* (2019.05); *B60K 2370/161* (2019.05); *B60K 2370/177* (2019.05); *B60K 2370/188* (2019.05); *B60K 2370/349* (2019.05); *B60K 2370/52* (2019.05); *B60W 2050/146* (2013.01)

(58) Field of Classification Search
CPC ........ B60K 2370/161; B60K 2370/177; B60K 2370/349; B60K 2370/188; B60K 2370/52; B62D 15/0295
See application file for complete search history.

(56) References Cited

U.S. PATENT DOCUMENTS

| | | | | |
|---|---|---|---|---|
| 10,900,793 | B2* | 1/2021 | Jung | G06V 20/588 |
| 11,514,793 | B2* | 11/2022 | Shimizu | G08G 1/166 |
| 2010/0007478 | A1* | 1/2010 | Hahn | B62D 15/0275 |
| | | | | 340/431 |
| 2011/0125369 | A1* | 5/2011 | Roh | B60W 30/12 |
| | | | | 701/41 |
| 2012/0123613 | A1* | 5/2012 | Waki | G08G 1/166 |
| | | | | 701/1 |
| 2012/0314055 | A1* | 12/2012 | Kataoka | G08G 1/167 |
| | | | | 382/104 |
| 2015/0204687 | A1 | 7/2015 | Yoon et al. | 701/436 |
| 2015/0352954 | A1 | 12/2015 | Cho et al. | 701/1 |
| 2017/0136878 | A1 | 5/2017 | Frank et al. | 345/619 |
| 2017/0247054 | A1* | 8/2017 | Lee | B62D 15/029 |
| 2019/0031027 | A1 | 1/2019 | Pala et al. | |
| 2020/0377088 | A1* | 12/2020 | Fukushige | B60W 40/105 |
| 2020/0410704 | A1* | 12/2020 | Choe | G06T 7/55 |
| 2022/0024314 | A1* | 1/2022 | Yagyu | B60K 35/00 |
| 2022/0144087 | A1* | 5/2022 | Takemori | G08G 1/16 |

FOREIGN PATENT DOCUMENTS

| | | | | |
|---|---|---|---|---|
| DE | 102019207951 | A1 | 12/2020 | B60W 30/12 |
| WO | 2017/162278 | A1 | 9/2017 | B60W 30/18 |
| WO | 2019/071212 | A1 | 4/2019 | G05D 1/00 |
| WO | 2020/239303 | A1 | 12/2020 | B60K 37/06 |

OTHER PUBLICATIONS

International Search Report and Written Opinion, Application No. PCT/EP2020/059797, 8 pages, dated Jun. 30, 2020.

\* cited by examiner

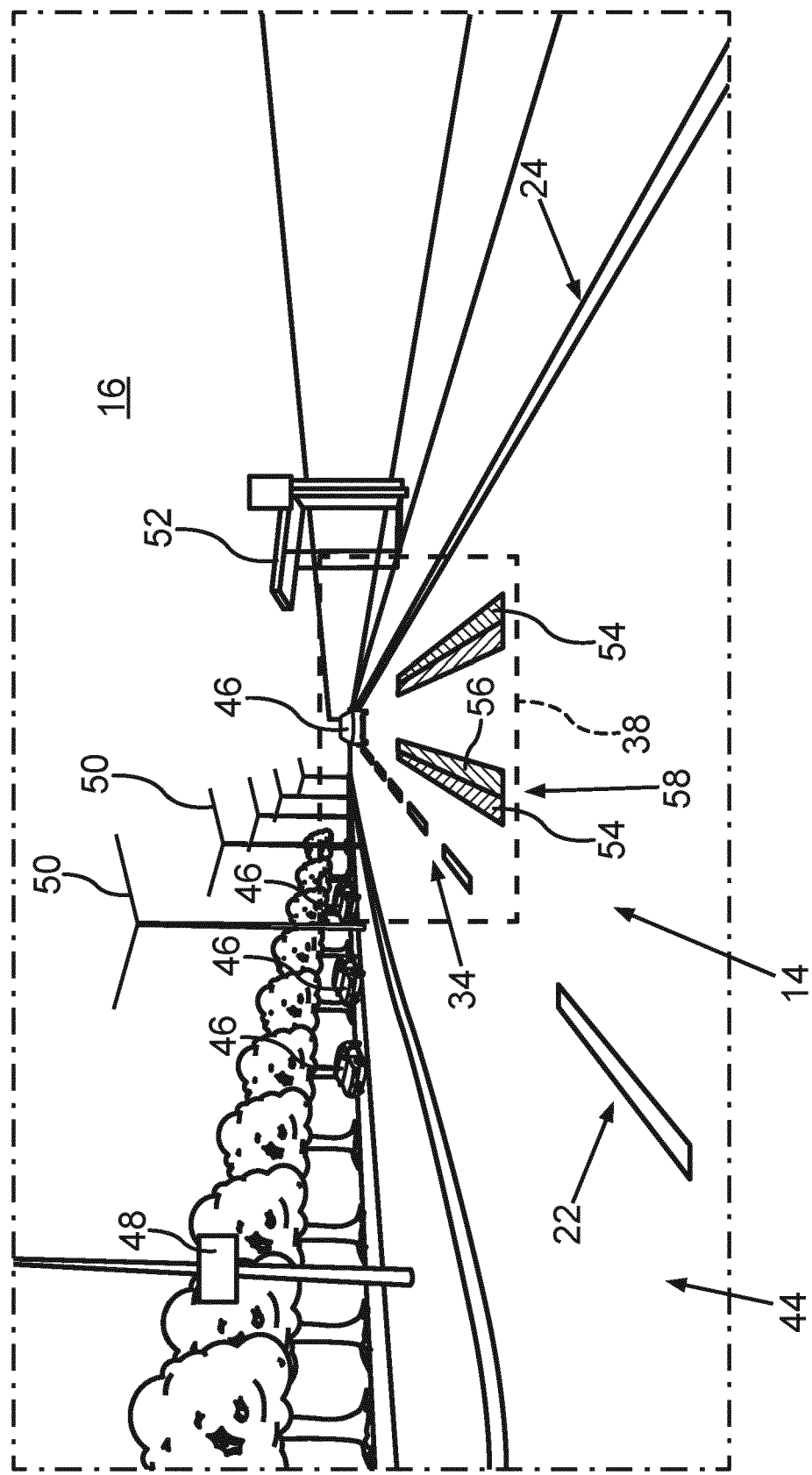

METHOD FOR CARRYING OUT A CORRECTION OF THE DIRECTION OF TRAVEL BY A DRIVER ASSISTANCE SYSTEM IN A MOTOR VEHICLE, AND A CONTROL DEVICE THEREFOR

CROSS-REFERENCE TO RELATED APPLICATIONS

This application claims priority to German Patent Application No. DE 10 2019 207 951.2, filed on May 29, 2019 with the German Patent and Trademark Office. The contents of the aforesaid Patent Application are incorporated herein for all purposes.

TECHNICAL FIELD

The invention relates to a method for performing a correction of a direction of travel by a driver assistance system in a motor vehicle. Moreover, the invention relates to a control device thereof.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A driver assistance system in a motor vehicle is designed to help control the motor vehicle while driving when the motor vehicle is rolling. In this regard, the driver assistance system comprises for example a lane assist (LA) to steer the motor vehicle depending on a course of at least one lane that is identified by using detected environmental features. In this context, information from the driver assistance system may be displayed, i.e., output, to signal the momentary activity of the driver assistance system, by means of an output apparatus, in particular an output apparatus based on augmented reality or AR, and/or a display in a line of sight of a driver of the motor vehicle, for example a head-up display or HUD display.

In the case of an automatic intervention, a danger exists of a driver panicking and intervening in the automatic driving maneuver and overcontrolling or thwarting it.

SUMMARY

A need exists for a correction of a direction of travel of a motor vehicle to be performed in a very user-friendly manner by a driver assistance system when traveling on a lane.

The need is addressed by the subject matter of the independent claims. Embodiments are presented in the dependent claims, the following description and the FIGS.

BRIEF DESCRIPTION OF THE DRAWINGS

FIG. 2 shows a sketch of a view in the direction of travel with a viewing direction from an interior of the motor vehicle.

DESCRIPTION

Figure 1:
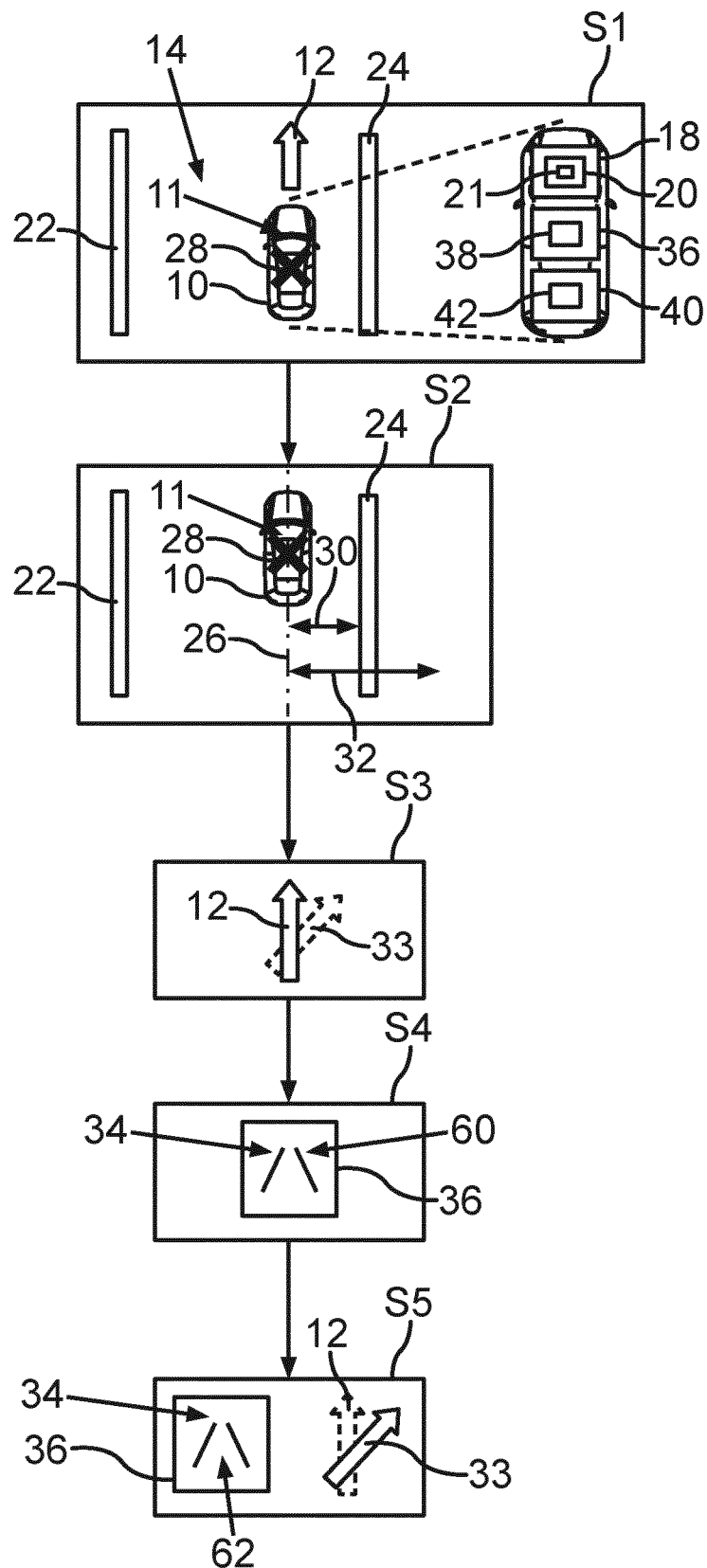
FIG. 1 shows a schematic progression of a method for performing a correction of a direction of travel in a motor vehicle by a driver assistance system.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A method according to a first exemplary aspect for performing a correction of a direction of travel by a driver assistance system in a motor vehicle is performed by a control device of the driver assistance system while the motor vehicle is driving in a direction of travel within a currently traveled lane. If a need for correcting the direction of travel to subsequently operate the motor vehicle within the currently traveled lane is recognized, then at least one display symbol is output by means of an output apparatus of the motor vehicle, wherein the at least one display symbol displays the correction of the motor vehicle to be performed. Only afterward the correction of the direction of travel displayed by the at least one display symbol is performed, wherein steering the motor vehicle is controlled, and in doing so, the at least one display symbol is still output. This means that the steering of the motor vehicle is actively influenced, i.e., controlled, by the control device of the driver assistance system. An intervention by the driver assistance system occurs if it is recognized that there should be an intervention in the steering of the motor vehicle so that the motor vehicle will continue to drive, i.e., roll, within the lane. In doing so, the intervention of the driver assistance system in controlling or transversely guiding the motor vehicle is output beforehand, i.e., displayed, before the correction of the direction of travel is performed by the at least one display symbol, for example a visual graphic element. The at least one display symbol is visibly depicted by the output apparatus, for example a screen, to a vehicle passenger, in particular the vehicle passenger steering the motor vehicle. The subsequent intervention by the driver assistance system is performed without active involvement of the vehicle passenger, wherein the vehicle passenger is, however, informed of the performance of the correction of the direction of travel of the motor vehicle by the displayed, at least one display symbol in advance, i.e., before the intervention, and at the same time, i.e., while the correction of the direction of travel is being performed. For example, the method may be performed in a driving situation when the motor vehicle is driving within the lane and in doing so is slowly approaching a boundary of the lane, i.e., not directly perceptible by the vehicle passenger. In doing so, the driver assistance system recognizes, for example by a camera, that the correction of the direction of travel is needed so that the motor vehicle is still operated within the lane and does not drive over the boundaries of the lane. In order to make the vehicle passenger aware of the pending correction of the direction of travel to be performed by the driver assistance system, the intervention to be performed at a later time is depicted by the at least one display symbol. Then the control device performs the correction of the direction of travel by controlling the steering the motor vehicle. The at least one display symbol displayed by the display device is still output while the correction is being performed.

It is beneficial that the correction of the direction of travel is independent of an action, i.e., an activity of the vehicle passenger, for example an actuation of a steering wheel of the motor vehicle by the vehicle passenger steering the motor vehicle, and is instigated and performed as needed by the driver assistance system. The vehicle passenger informed beforehand may therefore prepare for the intervention of the driver assistance system, or respectively easily track the intervention of the driver assistance system since he is made aware beforehand of the correction of the direction of travel. Accordingly, it may be prevented that an opposite measure, such as suddenly actuating the steering wheel in an opposite direction, is initiated by the vehicle passenger in reaction to the correction of the direction of travel performed by the driver assistance system. Moreover, a probability is reduced of the vehicle passenger unintentionally reinforcing the correction performed by the driver assistance system by actuating the steering wheel because the vehicle passenger was unaware of the intervention by the driver assistance system. Since the vehicle passenger is informed with respect to the intervention of the driver assistance system, safety while operating the motor vehicle may be increased.

The present aspect is based on the insight that behavior by the driver assistance system is depicted to the vehicle passenger by outputting the at least one display symbol, and therefore awareness by the vehicle passenger of the intervention of the driver assistance system is achieved. Moreover, information characterizing the correction of the direction of travel may be output to the vehicle passenger at the right time, i.e., in preparation for and while the correction of the direction of travel is being performed.

Some embodiments provide that the output apparatus comprises a screen for an augmented reality (AR) display. By means of the screen, the correction of the direction of travel to be performed and/or being performed is output to a vehicle passenger in that the at least one display symbol of the vehicles environment is at least partially overlaid. The screen is in particular a so-called head-up display (HUD) arranged in a field of vision of the vehicle passenger steering the motor vehicle. This means that the vehicles environment may be seen through the partially transparent, at least one display symbol. Accordingly, the vehicle passenger may detect the vehicles environment without a section of the vehicles environment being completely covered by the at least one display symbol. For example, by means of the at least one display symbol, a boundary of the lane is displayed, wherein a surface of the lane covered by at least one display symbol, i.e., overlaid, is still visible. This may increase informational content for the vehicle passenger since both the vehicles environment as well as the at least one display symbol characterizing the correction of the direction of travel are depicted.

Some embodiments in this regard provide that the output apparatus comprises a vibration element arranged on a steering wheel of the motor vehicle for outputting a haptic signal. By means of the vibration element, the correction to be performed and/or being performed of the direction of travel is output to the vehicle passenger steering the motor vehicle at least partially at the same time as the at least one displayed display symbol. Accordingly, the correction of the direction of travel visually displayed by the at least one display symbol is at least partially underscored by the haptic signal, i.e., reinforced thereby. Alternatively or in addition, it may be provided that the at least one display symbol and the haptic signal are output in sync. If for example the at least one displayed display symbol is designed similar to the vehicles environment and has in particular a similar color, then it may only be perceived with difficulty by the vehicle passenger. That is, the vehicle passenger may have difficulties distinguishing the at least one display symbol from the vehicles environment. By means of the haptic signal, the correction of the direction of travel to be performed and/or being performed may also be perceived if the vehicle passenger does not recognize or overlooks at least one display symbol.

Some embodiments provide that the at least one display symbol is arranged with a vanishing point and within two boundaries of the currently traveled lane in the direction of travel, and/or graphically displays one of the two boundaries of the lane. This means that a vehicles environment of the motor vehicle may be detected outside of the lane without restriction, i.e., completely, and the at least one display symbol is only arranged within the boundaries delimiting the lane to the outside. For example, the boundaries of the lane are a lane marker and/or a physical boundary such as a curb. If the motor vehicle is operated within the lane, then a trajectory of the lane is shown to the vehicle passenger by the display with a vanishing point. Accordingly, the at least one display symbol may be intuitively linked to the vehicles environment. Moreover, by means of the completely visible boundaries, the lane may be perceived as being bounded to the outside even if the correction of the direction of travel is output by the at least one display symbol.

Some embodiments in this regard provide that the at least one display symbol comprises at least one dynamic display symbol by means of which the correction of the direction of travel is displayed changing over time. This means that the at least one dynamic display symbol varies. The at least one dynamic display symbol is for example a dynamic graphic element arranged parallel to one of the boundaries of the lane, by means of which the correction of the direction of travel is schematically displayed. Accordingly in particular, a progression over time and/or an extent of the correction of the direction of travel may be visually output. The vehicle passenger may thereby for example be shown whether the performance of the correction has just started, or whether it has already largely concluded. Moreover, it may be displayed whether the correction of the direction of travel is greater, or less than, or equal to a given correction factor, for example a steering angle. It is beneficial that the vehicle passenger may very easily recognize the correction of the direction of travel by the at least one dynamic display symbol and may classify the intervention of the driver assistance system for himself.

Some embodiments provide that the at least one display symbol comprises at least one static display symbol, by means of which at least one of the two boundaries of the lane is displayed constant over time, wherein the at least one dynamic display symbol is arranged on one of the two boundaries and directly on the at least one static display symbol in order to visually form a common output area with the at least one static display symbol. Accordingly, the output of the two display symbols is locally linked to each other. This means that the at least one dynamic display symbol and the at least one static display symbol form a common unit to the vehicle passenger. A section of the output area enclosed by at least one dynamic display symbol is variable, i.e., changeable, and a section of the output area enclosed by at least one static display symbol is steadily perceived, i.e., unchanging over time. The at least one static display symbol is for example a static graphic element arranged parallel to one of the boundaries of the lane directly on the at least one dynamic graphic element, by means of which at least one of the boundaries is schematically displayed. It is beneficial that a geometry of the lane, in particular in comparison to the other lanes, is permanently displayed by the at least one static display symbol.

Some embodiments provide that the outputting of the at least one display symbol comprises a plurality of temporally sequential output phases. Depending on the particular output phase, at least one output parameter of the at least one display symbol is changed, wherein the at least one output parameter comprises an output intensity, and/or an output color, and/or an output duration. This means that the at least one display symbol is output in several steps, i.e., several output phases. In the particular output phase, the at least one output parameter of the display symbol is varied, for example increased or reduced, in order to predefine an expression and/or a characteristic of the at least one display symbol. For example at the beginning of performing the correction of the direction of travel, the at least one display symbol may be output to the vehicle passenger in a particularly noticeable manner. The output intensity of the at least one display symbol is high, the output color comprises a bright signal color, and the output duration is long. If the correction of the direction of travel has already been performed to a great extent, then the output intensity is low, the output color is a subdued signal color, and the output duration is short. Alternatively or in addition, it may be provided that, before the correction of the direction of travel is performed, the at least one display symbol is output less pronounced to the vehicle passenger than when the correction is being performed in order to prepare the vehicle passenger for the intervention to be performed and to not startle him. Accordingly, the vehicle passenger may make an estimation as to whether and to what extent the correction of the direction of travel will be and/or is being performed by the driver assistance system.

Some embodiments provide that at least one first display symbol is output in a first output phase of the several output phases, and at least one second display symbol is output in a second output phase following the first output phase, wherein a first output intensity of the first display symbol is greater than a second output intensity of the second display symbol. This means that a particular output intensity is reduced in a progression over time of the performed correction of the direction of travel. For example, the at least first display symbol that is output at the beginning of the correction, and whose output intensity is high in comparison to the output intensity of the at least one second output symbol may clearly show the vehicle passenger the intervention of the driver assistance system in steering. At this time, it is beneficial if the at least one first display symbol is output to the vehicle passenger very noticeably, by means of which he is made aware. If contrastingly the correction of the direction of travel has already been performed, then the at least second display symbol whose output sensitivity is comparatively low, notifies the vehicle passenger who has already been made aware by the at least first display symbol. Alternatively or in addition, it may be provided that, in an output phase temporally preceding the first output phase, a so-called introductory output phase, at least one additional display symbol is output whose output intensity is less than the first output intensity in order to prepare the vehicle passenger for the outputting of the at least one first display symbol.

It is furthermore provided that a relative position of the motor vehicle is detected relative to the currently traveled lane. By using the detected relative position of the motor vehicle, a distance of the motor vehicle to at least one of the two boundaries of the currently traveled lane is ascertained. If the ascertained distance is less than a minimum distance, the need for performing the correction of the direction of travel is recognized. The relative position of the motor vehicle and the currently traveled lane, in particular at least one of the boundaries, are for example ascertained, i.e., determined, by a sensor apparatus of the motor vehicle (such as a camera) and/or by a global navigation satellite system of the motor vehicle, and/or by an external apparatus connected by a communication link to the motor vehicle, such as a server, and/or at least one additional vehicle, and/or a measuring station at the roads edge. By means of an evaluation apparatus of the motor vehicle, it is ascertained using the detected relative position of the motor vehicle and the at least one of the two detected boundaries of the lane, whether the predetermined, in particular minimum distance between the motor vehicle and the at least one boundary archived in a memory apparatus of the control device is undershot. If the minimum distance is undershot, then the driver assistance system may introduce and perform the correction of the direction of travel by controlling the steering of the motor vehicle. It is beneficial for the need for correction to be ascertained by the driver assistance system based on the detected relative position with respect to the lane, and not based on a potentially insufficient or faulty estimation by the vehicle passenger. Accordingly, safety of the vehicle passenger and/or other road users may be increased.

A control device according to another exemplary aspect for a driver assistance system of a motor vehicle has a processor apparatus that is configured to perform a method for performing a correction of a direction of travel by the driver assistance system. To this end, the processor apparatus may have at least one microprocessor, and/or at least one microcontroller, and/or at least one FPGA (field programmable gate array), and/or at least one DSP (digital signal processor). Moreover, the processor apparatus may have a program code that is configured to perform the method while being run by the processor apparatus. The program code may be stored in a data memory of the processor apparatus.

Some embodiments of the control device of the motor vehicle have features which have already been described in conjunction with the embodiments of the method of the first exemplary aspect. For this reason, the corresponding embodiments of the control device are not again described.

The invention also includes combinations of the features of the described embodiments.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a schematic progression of a method comprising several method steps S1 to S5. In a first, preparatory method step S1, a motor vehicle 10 drives with a vehicle passenger 11, in particular the vehicle passenger 11 steering the motor vehicle 10, in a direction of travel 12 within a currently traveled lane 14 of a vehicles environment 16. The motor vehicle 10 comprises a driver assistance system 18, wherein a control apparatus 20 of the driver assistance system 18 performs respective method steps S1 to S5 by means of a processor apparatus 21 of the control apparatus 20, wherein to perform a correction of the direction of travel 12, motor vehicle 10 steering is controlled. The lane 14 is bordered to the outside by two boundaries 22, 24 that are designed as lane markers. During optimum operation of the motor vehicle 10 within the currently traveled lane 14, a longitudinal axis 26 of the motor vehicle 10 runs substantially parallel to the two boundaries 22, 24. To detect a relative position 28 of the motor vehicle 10, schematically indicated with a cross, relative to the current lane 14, in particular its border 22, 24, the motor vehicle 10 has a sensor apparatus, such as a camera or a speedometer, and a global navigation satellite system. By using the detected relative position 28 of the motor vehicle 10, a distance 30 of the motor vehicle 10 from at least one of the two boundaries 22, is ascertained in a second method step S2 by the processor apparatus 21. If the ascertained distance 30 of the motor vehicle 10 is less than an archived minimum distance 32, a need for performing the correction of the direction of travel 12 is recognized in a third method step S3 in order to continue operating the motor vehicle 10 within the currently traveled lane 14. When correcting the direction of travel 12 by controlling the steering of the motor vehicle 10, the direction of travel 12 is changed, i.e., adjusted, to a corrected direction of travel 33. In a fourth method step S4, at least one display symbol 34 is output by an output apparatus 36 of the motor vehicle 10, wherein the at least one display symbol 34 displays the correction of the direction of travel 12 to be performed in the corrected direction of travel 33. Subsequently in a fifth method step S5, the correction of the direction of travel 12 is performed, wherein the motor vehicle 10 steering is controlled by the control device 20 of the driver assistance system 18. In doing so, the at least one display symbol 34 is displayed by the output apparatus 36 to output the correction of the direction of travel 12 to be performed.

The output apparatus 36 comprises a screen 38 for so-called augmented reality (AR) of the at least one display symbol 34 designed as an visual graphic element, and a vibration element 42 arranged on a steering wheel 40 of the motor vehicle 10 for outputting a haptic signal. By means of the output at least one display symbol 34, in particular in combination with the at least partially simultaneously output haptic signal, the vehicle passenger 11, in particular the vehicle passenger 11 steering the motor vehicle 10, is displayed the correction of the direction of travel 12 to be performed and/or being performed. When the at least one display symbol 34 is being output, the at least one partially transparent display symbol 34 is at least partially superimposed over the vehicles environment 16. The screen 38 is in particular a head-up screen, a so-called head up display (HUD), arranged in a line of sight of the vehicle passenger 11 steering the motor vehicle 10.

In a front view with a vanishing point, FIG. 2 shows the lane 14 to be traveled with the viewing direction from an interior of the motor vehicle 10 in the direction of travel 12 through a front windshield of the motor vehicle 10. The motor vehicle 10 is operated within the currently traveled lane 14 on which another lane 44 is arranged. The lane 14 is bordered to the outside by the two boundaries 22, 24, wherein one of the boundaries 22 is configured as a lane marker, and one of the boundaries 24 is configured as a curb. Moreover, other road users 46 moving in, and opposite, the direction of travel 12 and components of the vehicles environment 16 such as at least one traffic sign 48, lane lighting elements 50 and an urban transport infrastructure 52 configured as a stop are shown. The screen 38 designed as a head-up screen is arranged in a viewing direction of the vehicle passenger 11 steering the motor vehicle and outputs the at least one partially transparent display symbol 34 superimposed over the vehicles environment 16. The at least one display symbol 34 has a vanishing point and is arranged within the two boundaries 22, 24 of the currently traveled lane 14. The at least one display symbol 34 comprises at least one dynamic display symbol 54 for the display, that changes over time, of the correction of the lane 14 to be performed or being performed, and at least one static display symbol 56 for displaying continuously, i.e., constantly over time, at least one of the two boundaries 22, 24 of the currently traveled lane 14. The at least one dynamic display symbol 54 is arranged on one of the two boundaries 22, 24 and directly on the at least one static display symbol 56, i.e., the at least one dynamic display symbol 54 is depicted between one of the two boundaries 22, 24 and the at least one static display symbol 56. The at least one dynamic display symbol 54 and the at least one static display symbol 56 form a common output area 58.

The outputting of the at least one display symbol 34 comprises a plurality of temporally sequential output phases, wherein schematically in FIG. 1, the fourth method step S4 represents a first output phase, and the fifth method step S5 represents a second output phase following the first output phase. Depending on the particular output phase, at least one output parameter such as an output intensity, an output color and/or an output duration of the at least one display symbol 34 changes. At least one first display symbol 60 is output in the first output phase, and at least one second display symbol 62 is output in the second output phase, wherein a first output intensity of the at least one first display symbol 60 is greater than a second output intensity of the at least one second display symbol 62 in order for example to differentiatedly output a course over time of the correction of the direction of travel 12 and to depict a plurality of sequential graphic output phases.

The driver assistance system 18 is designed to help the motor vehicle 10 while operating within the currently traveled lane 14. For example, the vehicle passenger 11 unintentionally leaving the lane 14 is prevented or reversed by the correction of the direction of travel 12 so that the motor vehicle 10 again drives within the lane 14. Currently, only one operating mode of the driver assistance system 18 is output to the vehicle passenger 11 so that one active operating mode and one inactive operating mode are displayed. To inform the vehicle passenger 11 in detail about the correction of the direction of travel 12 to be performed and being performed by the driver assistance system 18, an intervention by the driver assistance system 18 may be output in an animated manner by outputting the at least one display symbol 34. In addition, the output color of the at least one output symbol 34 may be correspondingly adapted. In doing so, the at least one output symbol 34 has a geometric shape that reflects i.e., depicts, a course of the lane 14 and in particular its boundaries 22, 24, for example in a curve. The informed vehicle passenger 11 may easily comprehend a behavior of the driver assistance system 18 during a trip with the motor vehicle 10. In particular, a synchronized output of the at least one visual display symbol 34 by the output apparatus 36 together with the haptic signal by the vibration element 42 arranged on the steering wheel 40 may very clearly indicate the correction of the direction of travel 12. Accordingly, information relevant in this context is output to the vehicle passenger 11 by the at least one display symbol 34 at a suitable point in time at an output position suitable for him.

The vehicle assistance system 18 is in particular designed to be used in the motor vehicle 10 during so-called augmented driving, i.e., driving with augmented reality, wherein the motor vehicle may have an autonomous level 1 to 5. Other applications comprise display apparatuses 36 such as glasses with augmented reality (augmented reality glasses or AR glasses), and a head-up screen (head-up display or HUD) of a mobile terminal, or other devices for displaying the augmented reality. Alternatively or in addition, a virtual reality (VR) and a mixed reality (MR) may be displayed. Alternatively or in addition, the vehicle assistance system 18 may be used in the following vehicles different from a motor vehicle 10: electric road vehicles such as electric bicycles (E-bike or pedelec), scooters, E-scooters, electric pedal scooters or electric cars; aircraft such as drones; rail vehicles such as trains; and watercraft such as ships.

Overall, the example shows how, by means of the teachings herein, the vehicle passenger 11 is shown the correction of the direction of travel 12 to be performed and/or being performed by the driver assistance system 18 designed as an AR lane assist.

LIST OF REFERENCE NUMERALS

10 Motor vehicle
11 Vehicle passenger
12 Direction of travel
14 Lane
16 Vehicles environment
18 Driver assistance system
20 Control device
21 Processor apparatus
22 Boundary
24 Boundary
26 Longitudinal axis
28 Relative position
30 Distance
32 Minimum distance
33 Direction of travel
34 Display symbol
36 Display apparatus
38 Screen
40 Steering wheel
42 Vibration element
44 Lane
46 Road user
48 Traffic sign
50 Lane lighting element
52 Urban transport infrastructure
54 Display symbol
56 Display symbol
58 Output area
60 Display symbol
62 Display symbol
S1 Step
S2 Step
S3 Step
S4 Step
S5 Step

What is claimed is:

1. A method for performing a correction of a direction of travel by a driver assistance system in a motor vehicle, wherein the motor vehicle is traveling in the direction of travel within a currently traveled lane, and a control device of the driver assistance system performs:
    detecting a relative position of the motor vehicle with respect to the currently traveled lane;
    determining a distance of the motor vehicle to at least one of two boundaries of the currently traveled lane using the detected relative position of the motor vehicle;
    recognizing a need for correcting the direction of travel to further operate the motor vehicle within the currently traveled lane if the determined distance is less than a minimum distance;
    displaying at least one symbol with an output apparatus of the motor vehicle, wherein the at least one symbol indicates the correction of the direction of travel to be performed before performing the correction of the direction of travel; and
    performing the correction of the direction of travel indicated by the at least one symbol without active intervention by a vehicle passenger, wherein a steering of the motor vehicle is controlled.

2. The method of claim 1, wherein the output apparatus comprises a screen for an augmented reality display of a vehicle environment using which the correction of the direction of travel is displayed to the passenger in that the at least one symbol is at least partially superimposed over the vehicle environment.

3. The method of claim 2, wherein the output apparatus further comprises a vibration element arranged on a steering wheel of the motor vehicle for transmitting a haptic signal, with which the correction of the direction of travel is output to the vehicle passenger steering the motor vehicle at least partially simultaneously with the displayed at least one symbol.

4. The method of claim 3, wherein the at least one symbol is arranged in the direction of travel with a vanishing point and within the two boundaries of the currently traveled lane, and the correction and/or at least one of the two boundaries of the lane is graphically displayed.

5. The method of claim 4, wherein the at least one symbol comprises at least one dynamic symbol with which the correction of the direction of travel is displayed changing over time.

6. The method of claim 5, wherein the at least one symbol comprises at least one static symbol with which at least one of the two boundaries of the lane is displayed constant over time, wherein the at least one dynamic symbol is arranged on one of the two boundaries and directly on the at least one static symbol in order to visually form a common output area with the at least one static symbol.

7. The method of claim 3, wherein displaying the at least one symbol comprises a plurality of temporally sequential output phases, and depending on the particular output phase, at least one output parameter of the at least one symbol changes, wherein the at least one output parameter comprises one or more of an output intensity, an output color, and an output duration.

8. The method of claim 2, wherein the at least one symbol is arranged in the direction of travel with a vanishing point and within the two boundaries of the currently traveled lane, and the correction and/or at least one of the two boundaries of the lane is graphically displayed.

9. The method of claim 8, wherein the at least one symbol comprises at least one dynamic symbol with which the correction of the direction of travel is displayed changing over time.

10. The method of claim 9, wherein the at least one symbol comprises at least one static symbol with which at least one of the two boundaries of the lane is displayed constant over time, wherein the at least one dynamic symbol is arranged on one of the two boundaries and directly on the at least one static symbol in order to visually form a common output area with the at least one static symbol.

11. The method of claim 2, wherein the outputting of the at least one symbol comprises a plurality of temporally sequential output phases, and depending on the particular output phase, at least one output parameter of the at least one symbol changes, wherein the at least one output parameter comprises one or more of an output intensity, an output color, and an output duration.

12. The method of claim 1, wherein the at least one symbol is arranged in the direction of travel with a vanishing point and within the two boundaries of the currently traveled lane, and the correction and/or at least one of the two boundaries of the lane is graphically displayed.

13. The method of claim 12, wherein the at least one symbol comprises at least one symbol with which the correction of the direction of travel is displayed changing over time.

14. The method of claim 13, wherein the at least one symbol comprises at least one static symbol with which at least one of the two boundaries of the lane is displayed constant over time, wherein the at least one dynamic symbol is arranged on one of the two boundaries and directly on the at least one static symbol in order to visually form a common output area with the at least one static symbol.

15. The method of claim 14, wherein displaying the at least one symbol comprises a plurality of temporally sequential output phases, and depending on the particular output phase, at least one output parameter of the at least one symbol changes, wherein the at least one output parameter comprises one or more of an output intensity, an output color, and an output duration.

16. The method of claim 13, wherein displaying the at least one symbol comprises a plurality of temporally sequential output phases, and depending on the particular output phase, at least one output parameter of the at least one symbol changes, wherein the at least one output parameter comprises one or more of an output intensity, an output color, and an output duration.

17. The method of claim 12, wherein displaying the at least one symbol comprises a plurality of temporally sequential output phases, and depending on the particular output phase, at least one output parameter of the at least one symbol changes, wherein the at least one output parameter comprises one or more of an output intensity, an output color, and an output duration.

18. The method of claim 1, wherein displaying the at least one symbol comprises a plurality of temporally sequential output phases, and depending on the particular output phase, at least one output parameter of the at least one symbol changes, wherein the at least one output parameter comprises one or more of an output intensity, an output color, and an output duration.

19. The method of claim 1, wherein at least one first symbol is output in a first output phase of several output phases, and at least one second symbol is output in a second output phase following the first output phase, wherein a first output intensity of the first symbol is greater than a second output intensity of the second symbol.

20. A control device for a driver assistance system of a motor vehicle, wherein the control device has a processor that is configured to perform:
  detecting a relative position of the motor vehicle with respect to a currently traveled lane;
  determining a distance of the motor vehicle to at least one of two boundaries of the currently traveled lane using the detected relative position of the motor vehicle;
  recognizing a need for correcting the direction of travel to further operate the motor vehicle within the currently traveled lane if the determined distance is less than a minimum distance;
  displaying at least one symbol by an output apparatus of the motor vehicle, wherein the at least one symbol displays the correction of the direction of travel to be performed before performing the correction of the direction of travel; and
  performing the correction of the direction of travel displayed by the at least one symbol without active intervention by a vehicle passenger, wherein a steering of the motor vehicle is controlled.

* * * * *